(12) United States Patent
Grichnik et al.

(10) Patent No.: US 7,565,333 B2
(45) Date of Patent: Jul. 21, 2009

(54) CONTROL SYSTEM AND METHOD

(75) Inventors: Anthony J. Grichnik, Peoria, IL (US);
Michael Seskin, Cardiff, CA (US);
Marco Perez, Chula Vista, CA (US);
Roy T. Collins, San Diego, CA (US)

(73) Assignee: Caterpillar Inc., Peoria, IL (US)

( * ) Notice: Subject to any disclaimer, the term of this patent is extended or adjusted under 35 U.S.C. 154(b) by 354 days.

(21) Appl. No.: 11/101,532

(22) Filed: Apr. 8, 2005

(65) Prior Publication Data

US 2006/0229769 A1    Oct. 12, 2006

(51) Int. Cl.
*G06F 15/18* (2006.01)
*G06N 3/12* (2006.01)

(52) U.S. Cl. .......................................... 706/12; 706/15

(58) Field of Classification Search .................... 706/12, 706/13, 15
See application file for complete search history.

(56) References Cited

U.S. PATENT DOCUMENTS

| | | |
|---|---|---|
| 3,316,395 A | 4/1967 | Lavin |
| 4,136,329 A | 1/1979 | Trobert |
| 4,533,900 A | 8/1985 | Muhlberger et al. |
| 5,014,220 A | 5/1991 | McMann et al. |
| 5,163,412 A | 11/1992 | Neu et al. |
| 5,262,941 A | 11/1993 | Saladin et al. |
| 5,341,315 A | 8/1994 | Niwa et al. |
| 5,386,373 A | 1/1995 | Keeler et al. |
| 5,434,796 A | 7/1995 | Weininger |
| 5,539,638 A | 7/1996 | Keeler et al. |
| 5,548,528 A | 8/1996 | Keeler et al. |
| 5,561,610 A | 10/1996 | Schricker et al. |
| 5,566,091 A | 10/1996 | Schricker et al. |
| 5,585,553 A | 12/1996 | Schricker |
| 5,594,637 A | 1/1997 | Eisenberg et al. |
| 5,598,076 A | 1/1997 | Neubauer et al. |
| 5,604,306 A | 2/1997 | Schricker |
| 5,604,895 A | 2/1997 | Raimi |
| 5,608,865 A | 3/1997 | Midgely et al. |

(Continued)

FOREIGN PATENT DOCUMENTS

EP    0 959 414    11/1999

(Continued)

OTHER PUBLICATIONS

Genichi Taguchi, Rajesh Jugulum, The Mahalanobis Taguchi Strategy, A Pattern Technology System, John Wlley & Sons, Inc., 2002.

(Continued)

*Primary Examiner*—David R Vincent
*Assistant Examiner*—Adrian L Kennedy
(74) *Attorney, Agent, or Firm*—Finnegan, Henderson, Farabow, Garrett & Dunner

(57) ABSTRACT

A method is provided for a control system. The method may include obtaining data records associated one or more input variables and one or more output parameters, and selecting one or more input parameters from the one or more input variables. The method may also include generating a computational model indicative of interrelationships between the one or more input parameters and the one or more output parameters based on the data records, and determining desired respective statistical distributions of the one or more input parameters of the computational model.

21 Claims, 5 Drawing Sheets

U.S. PATENT DOCUMENTS

| | | | |
|---|---|---|---|
| 5,666,297 A | 9/1997 | Britt et al. | |
| 5,682,317 A | 10/1997 | Keeler et al. | |
| 5,698,780 A | 12/1997 | Mizutani et al. | |
| 5,727,128 A | 3/1998 | Morrison | |
| 5,750,887 A | 5/1998 | Schricker | |
| 5,752,007 A | 5/1998 | Morrison | |
| 5,835,902 A * | 11/1998 | Jannarone | 706/26 |
| 5,842,202 A | 11/1998 | Kon | |
| 5,914,890 A | 6/1999 | Sarangapani et al. | |
| 5,925,089 A | 7/1999 | Fujime | |
| 5,950,147 A | 9/1999 | Sarangapani et al. | |
| 5,966,312 A | 10/1999 | Chen | |
| 5,987,976 A | 11/1999 | Sarangapani | |
| 6,086,617 A | 7/2000 | Waldon et al. | |
| 6,092,016 A | 7/2000 | Sarangapani et al. | |
| 6,119,074 A | 9/2000 | Sarangapani | |
| 6,145,066 A | 11/2000 | Atkin | |
| 6,195,648 B1 | 2/2001 | Simon et al. | |
| 6,199,007 B1 | 3/2001 | Zavarehi et al. | |
| 6,208,982 B1 | 3/2001 | Allen, Jr. et al. | |
| 6,223,133 B1 * | 4/2001 | Brown | 702/85 |
| 6,236,908 B1 | 5/2001 | Cheng et al. | |
| 6,240,343 B1 | 5/2001 | Sarangapani et al. | |
| 6,269,351 B1 | 7/2001 | Black | |
| 6,298,718 B1 | 10/2001 | Wang | |
| 6,370,544 B1 | 4/2002 | Krebs et al. | |
| 6,405,122 B1 | 6/2002 | Yamaguchi | |
| 6,438,430 B1 | 8/2002 | Martin et al. | |
| 6,442,511 B1 | 8/2002 | Sarangapani et al. | |
| 6,466,859 B1 | 10/2002 | Fujime | |
| 6,477,660 B1 | 11/2002 | Sohner | |
| 6,513,018 B1 | 1/2003 | Culhane | |
| 6,546,379 B1 | 4/2003 | Hong et al. | |
| 6,584,768 B1 | 7/2003 | Hecker et al. | |
| 6,594,989 B1 | 7/2003 | Hepburn et al. | |
| 6,698,203 B2 | 3/2004 | Wang | |
| 6,711,676 B1 | 3/2004 | Zomaya et al. | |
| 6,721,606 B1 * | 4/2004 | Kaji et al. | 700/17 |
| 6,725,208 B1 | 4/2004 | Hartman et al. | |
| 6,763,708 B2 | 7/2004 | Ting et al. | |
| 6,775,647 B1 | 8/2004 | Evans et al. | |
| 6,785,604 B2 | 8/2004 | Jacobson | |
| 6,804,600 B1 | 10/2004 | Uluyol et al. | |
| 6,810,442 B1 | 10/2004 | Lin et al. | |
| 6,823,675 B2 | 11/2004 | Brunell et al. | |
| 6,859,770 B2 | 2/2005 | Ramsey | |
| 6,859,785 B2 | 2/2005 | Case | |
| 6,865,883 B2 | 3/2005 | Gomulka | |
| 6,882,929 B2 | 4/2005 | Liang et al. | |
| 6,895,286 B2 * | 5/2005 | Kaji et al. | 700/28 |
| 6,935,313 B2 | 8/2005 | Jacobson | |
| 6,941,287 B1 * | 9/2005 | Vaidyanathan et al. | 706/12 |
| 6,952,662 B2 | 10/2005 | Wegerich et al. | |
| 6,976,062 B1 | 12/2005 | Denby et al. | |
| 7,000,229 B2 | 2/2006 | Gere | |
| 7,024,343 B2 | 4/2006 | El-Ratal | |
| 7,027,953 B2 | 4/2006 | Klein | |
| 7,035,834 B2 | 4/2006 | Jacobson | |
| 7,117,079 B2 | 10/2006 | Streichsbier et al. | |
| 7,124,047 B2 | 10/2006 | Zhang et al. | |
| 7,127,892 B2 | 10/2006 | Akins et al. | |
| 7,174,284 B2 | 2/2007 | Dolansky et al. | |
| 7,178,328 B2 | 2/2007 | Solbrig | |
| 7,191,161 B1 | 3/2007 | Rai et al. | |
| 7,194,392 B2 | 3/2007 | Tuken et al. | |
| 7,213,007 B2 | 5/2007 | Grichnik | |
| 7,356,393 B1 | 4/2008 | Schlatre et al. | |
| 7,369,925 B2 | 5/2008 | Morioka et al. | |
| 2002/0014294 A1 | 2/2002 | Okano et al. | |
| 2002/0016701 A1 | 2/2002 | Duret et al. | |
| 2002/0042784 A1 | 4/2002 | Kerven et al. | |
| 2002/0049704 A1 | 4/2002 | Vanderveldt et al. | |
| 2002/0103996 A1 | 8/2002 | LeVasseur et al. | |
| 2002/0198821 A1 | 12/2002 | Munoz | |
| 2003/0018503 A1 | 1/2003 | Shulman | |
| 2003/0055607 A1 | 3/2003 | Wegerich et al. | |
| 2003/0093250 A1 | 5/2003 | Goebel | |
| 2003/0126053 A1 | 7/2003 | Boswell et al. | |
| 2003/0126103 A1 | 7/2003 | Chen et al. | |
| 2003/0130855 A1 | 7/2003 | Babu et al. | |
| 2003/0167354 A1 | 9/2003 | Peppers et al. | |
| 2003/0187567 A1 | 10/2003 | Sulatisky et al. | |
| 2003/0187584 A1 | 10/2003 | Harris | |
| 2003/0200296 A1 | 10/2003 | Lindsey | |
| 2004/0030420 A1 * | 2/2004 | Ulyanov et al. | 700/48 |
| 2004/0034857 A1 | 2/2004 | Mangino et al. | |
| 2004/0059518 A1 | 3/2004 | Rothschild | |
| 2004/0077966 A1 * | 4/2004 | Yamaguchi et al. | 600/544 |
| 2004/0122702 A1 | 6/2004 | Sabol et al. | |
| 2004/0122703 A1 | 6/2004 | Walker et al. | |
| 2004/0128058 A1 * | 7/2004 | Andres et al. | 701/114 |
| 2004/0135677 A1 | 7/2004 | Asam | |
| 2004/0138995 A1 | 7/2004 | Hershkowitz et al. | |
| 2004/0153227 A1 * | 8/2004 | Hagiwara et al. | 701/40 |
| 2004/0230404 A1 | 11/2004 | Messmer et al. | |
| 2004/0267818 A1 | 12/2004 | Hartenstine | |
| 2005/0047661 A1 | 3/2005 | Mauer | |
| 2005/0055176 A1 | 3/2005 | Clarke et al. | |
| 2005/0091093 A1 | 4/2005 | Bhaskaran et al. | |
| 2005/0209943 A1 | 9/2005 | Ballow et al. | |
| 2005/0210337 A1 | 9/2005 | Chester et al. | |
| 2005/0240539 A1 | 10/2005 | Olavson | |
| 2005/0261791 A1 | 11/2005 | Chen et al. | |
| 2005/0262031 A1 | 11/2005 | Saidi et al. | |
| 2005/0278227 A1 | 12/2005 | Esary et al. | |
| 2005/0278432 A1 | 12/2005 | Feinleib et al. | |
| 2006/0010057 A1 | 1/2006 | Bradway et al. | |
| 2006/0010142 A1 | 1/2006 | Kim et al. | |
| 2006/0010157 A1 | 1/2006 | Dumitrascu et al. | |
| 2006/0025897 A1 | 2/2006 | Shostak et al. | |
| 2006/0026270 A1 | 2/2006 | Sadovsky et al. | |
| 2006/0026587 A1 | 2/2006 | Lemarroy et al. | |
| 2006/0064474 A1 | 3/2006 | Feinleib et al. | |
| 2006/0068973 A1 | 3/2006 | Kappauf et al. | |
| 2006/0129289 A1 | 6/2006 | Kumar et al. | |
| 2006/0130052 A1 | 6/2006 | Allen et al. | |
| 2006/0229753 A1 | 10/2006 | Seskin et al. | |
| 2006/0229769 A1 | 10/2006 | Grichnik et al. | |
| 2006/0229852 A1 | 10/2006 | Grichnik et al. | |
| 2006/0229854 A1 | 10/2006 | Grichnik et al. | |
| 2006/0230018 A1 | 10/2006 | Grichnik et al. | |
| 2006/0230097 A1 | 10/2006 | Grichnik et al. | |
| 2006/0230313 A1 | 10/2006 | Grichnik et al. | |
| 2006/0241923 A1 | 10/2006 | Xu et al. | |
| 2006/0247798 A1 | 11/2006 | Subbu et al. | |
| 2007/0061144 A1 | 3/2007 | Grichnik et al. | |
| 2007/0094048 A1 | 4/2007 | Grichnik | |
| 2007/0094181 A1 | 4/2007 | Tayebnejad et al. | |
| 2007/0118338 A1 | 5/2007 | Grichnik et al. | |
| 2007/0124237 A1 | 5/2007 | Sundararajan et al. | |
| 2007/0150332 A1 | 6/2007 | Grichnik et al. | |
| 2007/0168494 A1 | 7/2007 | Liu et al. | |
| 2007/0179769 A1 | 8/2007 | Grichnik et al. | |
| 2007/0203864 A1 | 8/2007 | Grichnik | |
| 2008/0154811 A1 | 6/2008 | Grichnik et al. | |

FOREIGN PATENT DOCUMENTS

| | | |
|---|---|---|
| EP | 1103926 | 5/2001 |
| EP | 1367248 | 12/2003 |
| EP | 1418481 | 5/2004 |
| JP | 10-332621 | 12/1998 |
| JP | 11-351045 | 12/1999 |
| JP | 2002-276344 | 9/2002 |

| | | |
|---|---|---|
| WO | WO97/042581 | 11/1997 |
| WO | WO02/057856 | 7/2002 |
| WO | WO2006/017453 | 2/2006 |

OTHER PUBLICATIONS

G. Galperin, G. Tesauro, Parallel Monte-Carlo Simulation of Neural Network Controllers, available at http://www-fp.mcs.anl.gov/ccst/research/reports_pre1998/neural_network/galperin.html, printed on Mar. 11, 2005.

Concurrently filed US nonprovisional application entitled "Probabilistic Modeling System for Product Design," by Michael Seskin et al.

Concurrently filed US nonprovisional application entitled "Mahalanobis Distance Genetic Algorithm (MDGA) Method and System," by Anthony Grichnik et al.

Concurrently filed US nonprovisional application entitled "Zeta Statistic Process Method and System," by Anthony Grichnik et al.

Concurrently filed US nonprovisional application entitled "Diagnostic and Prognostic Method and System," by Anthony Grichnik et al.

Concurrently filed US nonprovisional application entitled "Process Model Monitoring Method and System," by Anthony Grichnik et al.

U.S. Appl. No. 10/327,676 entitled "Methods and Systems for Modifying Flash Files," by Anthony Grichnik, filed on Dec. 24, 2002.

SID Sytsma, Quality and Statistical Process Control, available at http://www.sytsma.com/tqmtools/ctlchtprinciples.html, printed on Apr. 7, 2005.

Allen et al., "Supersaturated Designs That Maximize the Probability of Identifying Active Factors," 2003 American Statistical Association and the American Society for Quality, Technometrics, vol. 45, No. 1, Feb. 2003, pp. 1-8.

April, Jay et al., "Practical Introduction to Simulation Optimization," Proceedings of the 2003 Winter Simulation Conference, pp. 71-78.

Bandte et al., "Viable Designs Through a Joint Probabilistic Estimation Technique," SAE International, and the American Institute of Aeronautics and Astronautics, Inc., Paper No. 1999-01-5623, 1999, pp. 1-11.

Beisl et al., "Use of Genetic Algorithm to Identify the Source Point of Seepage Slick Clusters Interpreted from Radarsat-1 Images in the Gulf of Mexico," Geoscience and Remote Sensing Symposium, 2004, Proceedings, 2004 IEEE International Anchorage, AK, Sep. 20-24, 2004, vol. 6, Sep. 20, 2004, pp. 4139-4142.

Berke et al., "Optimum Design of Aerospace Structural Components Using Neural Networks," Computers and Structures, vol. 48, No. 6, Sep. 17, 1993, pp. 1001-1010.

Bezdek, "Genetic Algorithm Guided Clustering," IEEE 0-7803-1899-4/94, 1994, pp. 34-39.

Brahma et al., "Optimization of Diesel Engine Operating Parameters Using Neural Networks," SAE Technical Paper Series, 2003-01-3228, Oct. 27-30, 2003 (11 pages).

Chau et al., "Use of runs test to access cardiovascular autonomic function in diabetic subjects," Abstract, Diabetes Care, vol. 17, Issue 2, pp. 146-148, available at.

Chung et al., "Process Optimal Design in Forging by Genetic Algorithm," Journal of Manufacturing Science and Engineering, vol. 124, May 2002, pp. 397-408.

Cox et al., "Statistical Modeling for Efficient Parametric Yield Estimation of MOS VLSI Circuits," IEEE, 1983, pp. 242-245.

De Maesschalck et al., "The Mahalanobis Distance," Chemometrics and Intelligent Laboratory Systems, vol. 50, No. 1, Jan. 2000, pp. 1-18.

Dikmen et al., "Estimating Distributions in Genetic Algorithms," ISCIS 2003, LNCS 2869, 2003, pp. 521-528.

Gletsos et al., "A Computer-Aided Diagnostic System to Characterize CT Focal Liver Lesions: Design and Optimization of a Neural Network Classifier," IEEE Transactions on Information Technology in Biomedicine, vol. 7, No. 3, Sep. 2003 pp. 153-162.

Grichnik et al., "An Improved Metric for Robust Engineering," Proceedings of the 2007 International Conference on Scientific Computing, Las Vegas, NV (4 pages).

Holland, John H., "Genetic Algorithms," Scientific American, Jul. 1992, pp. 66-72.

Hughes et al., "Linear Statistics for Zeros of Riemann's Zeta Function," C.R. Acad. Sci. Paris, Ser. I335 (2002), pp. 667-670.

Ko et al., "Application of Artificial Neural Network and Taguchi Method to Perform Design in Metal Forming Considering Workability," International Journal of Machine Tools & Manufacture, vol. 39, No. 5, May 1999, pp. 771-785.

Kroha et al., "Object Server on a Parallel Computer," 1997 IEEE 0-8186-8147-0/97, pp. 284-288.

Mavris et al., "A Probabilistic Approach to Multivariate Constrained Robust Design Simulation," Society of Automotive Engineers, Inc., Paper No. 975508, 1997, pp. 1-11.

National Institute of Health, "10-year CVD Risk Calculator" available at http://hin.nhlbi.nih.gov/atpiii/calculator.asp?usertype=prof, printed Aug. 2, 2005, 2 pages.

Obayashi et al, "Multiobjective Evolutionary Computation for Supersonic Wing-Shape Optimization," IEEE Transactions on Evolutionary Computation, vol. 4, No. 2, Jul. 2000, pp. 182-187.

Simpson et al., "Metamodels for Computer-Based Engineering Design: Survey & Recommendations," Engineering with Computers, 2001, vol. 17, pp. 129-150.

Solar Turbines, "InSight System," Oct. 19, 2006, http://mysolar.cat.com.

Solar Turbines, "InSight Systems, Machinery Management Solutions," Oct. 19, 2006.

Song et al., "The Hyperellipsoidal Clustering Using Genetic Algorithm," 1997 IEEE International Conference on Intelligent Processing Systems, Oct. 28-31, 1997, Beijing, China, pp. 592-596.

Taylor et al., "Guidelines for Evaluating and Expressing the Uncertainty of NIST Measurement Results," NIST Technical Note 1297, 1994 Edition, United States Dept. of Commerce, National Institute of Standards and Technology (25 pages).

Thompson, G.J. et al., "Neural Network Modelling of the Emissions and Performance of a Heavy-Duty Diesel Engine," Proc. Instu. Mech. Engrs., vol. 214, Part D (2000), pp. 111-126.

Traver, Michael L. et al., "A Neural Network-Based Virtual NOx Sensor for Diesel Engines," West Virginia University, Mechanical and Aerospace Engineering Dept., Morgantown, WVA, 7 pages.

Traver, Michael L. et al., "Neural Network-Based Diesel Engine Emissions Prediction Using In-Cylinder Combustion Pressure," International Spring Fuels & Lubricants Meeting & Exposition, SAE Technical Paper Series, May 3-6, 1999, 17 pages.

Woodall, Tsui et al., "A Review and Analysis of the Mahalanobis-Taguchi System," Technometrics, Feb. 2003, vol. 45, No. 1 (15 pages).

Wu et al., "Cam-phasing Optimization Using Artificial Neural Networks as Surrogate Models—Fuel Consumption and Nox Emissions," SAE Technical Paper Series, 2006-01-1512, Apr. 3-6, 2006 (19 pages).

Yang et al., "Similar Cases Retrieval from the Database of Laboratory Test Results," Journal of Medical Systems, vol. 27, No. 3, Jun. 2003, pp. 271-282.

Yuan et al., "Evolutionary Fuzzy C-Means Clustering Algorithm," 1995 IEEE 0-7803-2461-7/95, pp. 2221-2226.

Majid et al. of Dec. 16, 2004 "Improving performance of nearest neighborhood classifier using genetic programming". Machine Learning and Applications, 2004. Proceedings. 2004 International Conf. on Louisville, KY. Piscataway, NJ. XP010763439, pp. 469-472.

Chau et al., "Use of runs test to access cardiovascular autonomic function in diabetic subjects," Abstract, Diabetes Care, vol. 17, Issue 2, pp. 146-148, available at http://care.diabetesjournals.org/cgi/content/abstract/17/2/146).

* cited by examiner

CONTROL SYSTEM AND METHOD

TECHNICAL FIELD

This disclosure relates generally to control systems and, more particularly, to mathematical model based control systems.

BACKGROUND

Modern work machines often require complex control systems to control a wide range of operations. For example, the operation of an engine system of a modern work machine may be controlled by a complex engine control system. The engine control system may provide a series control functions, such as closed loop combustion control, fuel control, gear control, torque control, and/or other engine controls, etc. Physical or process models may be used to implement some functions of the engine control system. A process model may refer to a physics or mathematics based model where the state of a process is monitored by measuring process variables. A process variable may refer to a variable related to conditions of the engine under control. The engine control system may use the value of the process variable and the model to control the operation of the engine within a normal range.

Conventional process model based control systems, such as described in U.S. Pat. No. 6,823,675 to Brunell et al. on Nov. 30, 2004, often relate individual input parameters or process variables to control functions without addressing inter-correlation between individual input parameters, especially at the time of generation and/or optimization of such process models. Thus, these systems may fail to simultaneously optimize input parameter distribution requirements.

Methods and systems consistent with certain features of the disclosed systems are directed to solving one or more of the problems set forth above.

SUMMARY OF THE INVENTION

One aspect of the present disclosure includes a method for a control system. The method may include obtaining data records associated with one or more input variables and one or more output parameters, and selecting one or more input parameters from the one or more input variables. The method may also include generating a computational model indicative of interrelationships between the one or more input parameters and the one or more output parameters based on the data records, and determining desired respective statistical distributions of the one or more input parameters of the computational model.

Another aspect of the present disclosure includes a control system. The control system may include one or more input elements configured to accept respective one or more input parameters to the control system and one or more output elements configured to accept respective one or more output parameters. The control system may also include a processor configured to control one or more hardware devices using the one or more output parameters based on a control model. The control model may be created by obtaining data records associated with the one or more input parameters and the one or more output parameters, and generating a computational model indicative of interrelationships between the one or more input parameters and the one or more output parameters based on the data records. The creation steps of the control model may also include determining desired respective statistical distributions of the one or more input parameters of the computational model, and recalibrating the one or more input parameters based on the desired statistical distributions.

Another aspect of the present disclosure includes a work machine. The work machine may include an engine and an engine control system. The engine control system may include a processor configured to obtain respective values of one or more input parameters and to derive respective values of one or more output parameters based on the values of input parameters and a first computational model indicative of interrelationships between the one or more input parameters and the one or more output parameters. The processor may also be configured to control the engine using the values of the one or more output parameters.

Another aspect of the present disclosure includes a computer system. The computer system may include a database, containing data records associated with one or more input variables and one or more output parameters, and a processor. The processor may be configured to select one or more input parameters from the one or more input variables and to generate a computational model indicative of interrelationships between the one or more input parameters and the one or more output parameters based on the data records. The processor may also be configured to determine desired respective statistical distributions of the one or more input parameters of the computational model and to recalibrate the one or more input parameters based on the desired statistical distributions.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
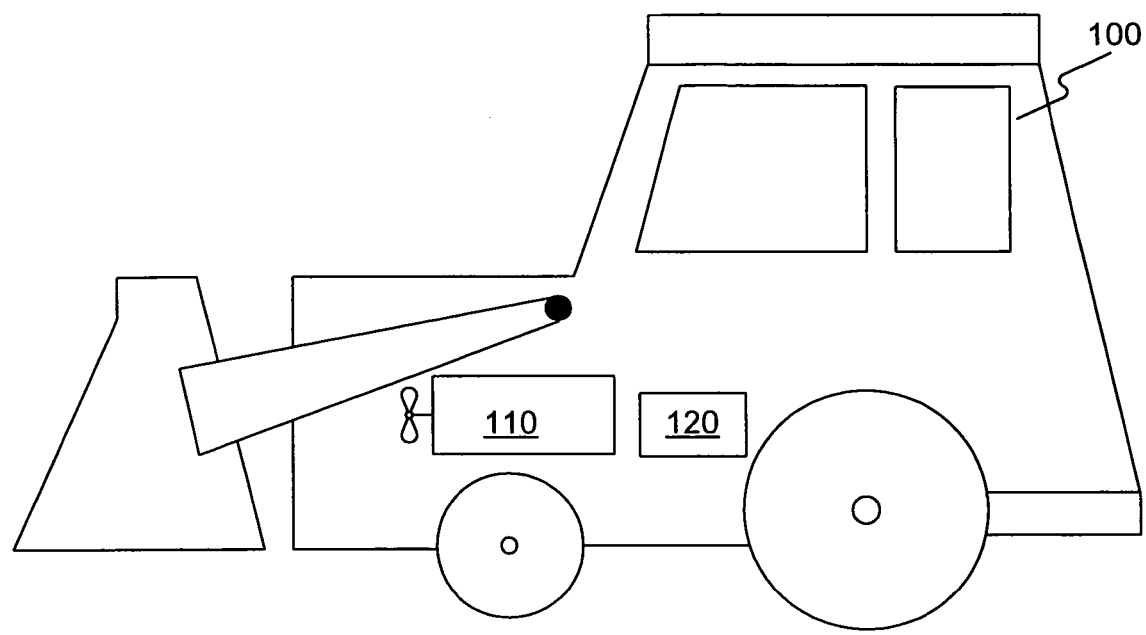
FIG. 1 is a pictorial illustration of an exemplary system that may incorporate certain disclosed embodiments.

FIG. 1 illustrates an exemplary work machine 100 in which features and principles consistent with certain disclosed embodiments may be incorporated. Work machine 100 may refer to any type of fixed or mobile machine that performs some type of operation associated with a particular industry, such as mining, construction, farming, transportation, etc. and operates between or within work environments (e.g., construction site, mine site, power plants and generators, on-highway applications, etc.). Non-limiting examples of mobile machines include commercial machines, such as trucks, cranes, earth moving vehicles, mining vehicles, backhoes, material handling equipment, farming equipment, marine vessels, aircraft, and any type of movable machine that operates in a work environment. Although, as shown in FIG. 1, work machine 100 is an earth handling type work machine, it is contemplated that work machine 100 may be any type of work machine. Further, work machine 100 may be conventionally powered, hybrid electric, and/or fuel cell powered.

Figure 2:
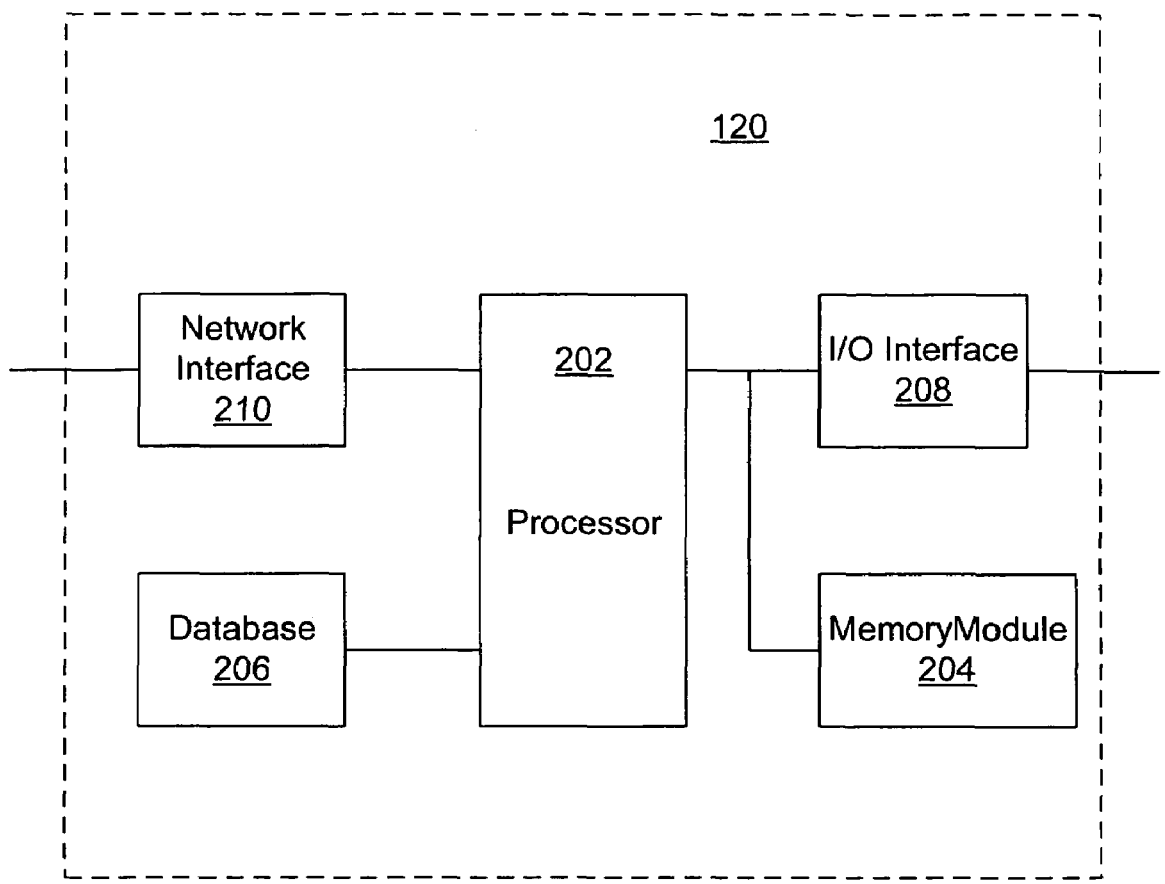
FIG. 2 illustrates a functional block diagram of an engine control system.

As shown in FIG. 1, work machine 100 may include an engine 110 and an engine control system 120. Engine 110 may include any appropriate type of engine that generates power for work machine 100, such as an internal combustion engine. Engine control system 120 may include any appropriate type of control system configured to perform engine control functions based on mathematical models. FIG. 2 shows an exemplary functional block diagram of engine control system 120.

As shown in FIG. 2, engine control system 120 may include a processor 202, a memory module 204, a database 206, an I/O interface 208, and a network interface 210. Other components may also be included in engine control system 120. Engine control system 120 may coincide, for example, with an electronic control unit (ECU) for work machine 100.

Processor 202 may include any appropriate type of general purpose microprocessor, digital signal processor, or microcontroller. Processor 202 may be configured as a separate processor module dedicated to controlling engine 110. Alternatively, processor 202 may be configured as a shared processor module for performing other functions unrelated to engine control.

Memory module 204 may include one or more memory devices including, but not limited to, a ROM, a flash memory, a dynamic RAM, and a static RAM. Memory module 204 may be configured to store information used by processor 202. Database 206 may include any type of appropriate database containing information on characteristics of input parameters, output parameters, mathematical models, and/or any other control information. Further, I/O interfaces 206 may also be connected to various sensors or other components (not shown) to monitor and control operations of engine 110. Network interface 210 may include any appropriate type of network adaptor capable of communicating with other computer systems based on one or more communication protocols.

Figure 3:
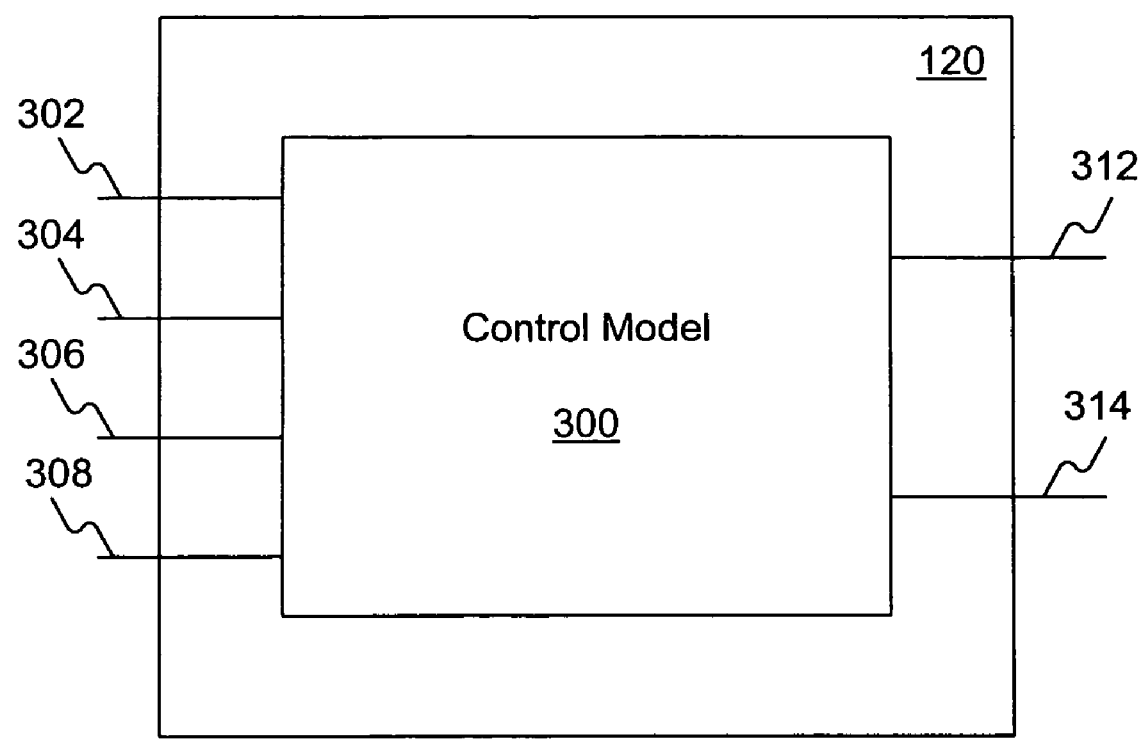
FIG. 3 illustrates a block diagram of an engine control model incorporating certain disclosed embodiments.

Engine control system 120 may include a control model reflecting relationships between input parameters to engine control system 120 and output parameters. Output parameters may be used to control different engine components. FIG. 3 shows an exemplary control model 300 incorporated in engine control system 120 consistent with certain disclosed embodiments. Although only four input parameters and two output parameters are shown in FIG. 3, any number of input and output parameters may be used.

As shown in FIG. 3, engine control system 120 may include control model 300. Control model 300 may have a plurality of input parameters and output parameters. For example, control model 300 may have input parameters 302, 304, 306, and 308. Input parameter 302 may correspond to a gas pedal indication, input parameter 304 may correspond to a gear selection, input parameter 306 may correspond to atmospheric pressure, and input parameter 308 may correspond to engine temperature. Control model 300 may also include output parameters 312 and 314. Output parameter 312 may be a throttle valve setting and output parameter 314 may be boost control. In operation, control model 300 may receive real-time values of input parameters 302 to 308 and derive values for output parameters 312 and 314 used by engine control system 120 to control operations of engine 110. Control model 300 may be generated and optimized according to the process shown in FIG. 4.

Figure 4:
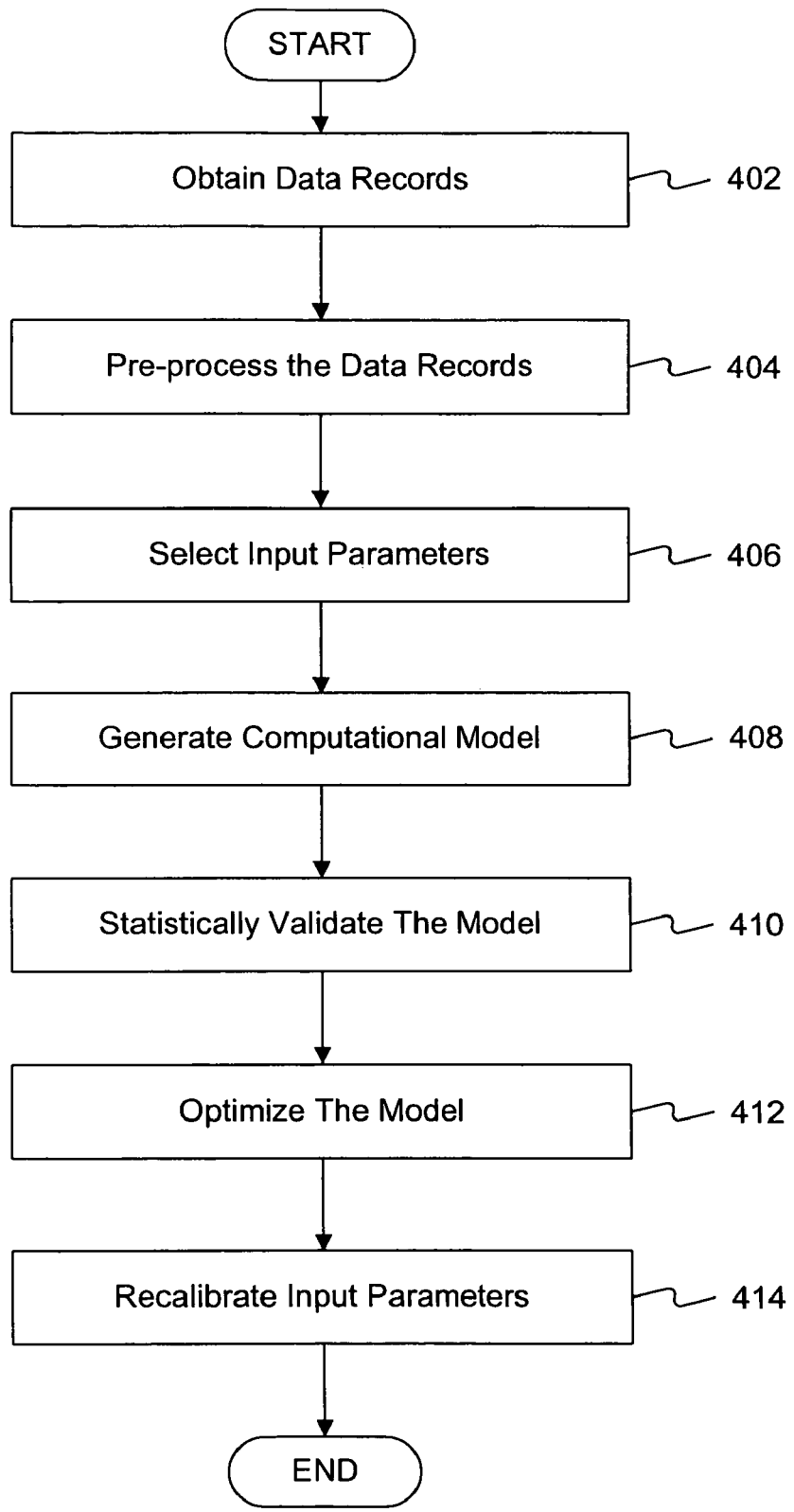
FIG. 4 illustrates an exemplary model generation and optimization process consistent with disclosed embodiments.

FIG. 4 shows an exemplary model generation and optimization process performed by engine control system 120 and, more specifically, by processor 202. Alternatively, the process may also be performed by an external computer system (e.g., any appropriate type of computer system) and the models may then be loaded into engine control system 120. When an external computer system is used to generate and optimize the models, processor 202 may refer to a central processing unit (CPU) of the external computer system configured to perform such processes.

At the beginning of the model generation and optimization process, processor 202 may obtain data records associated with input parameters and output parameters (step 402). The data records may be previously collected during a certain time period from a test engine or from a plurality of work machines and engines. The data records may also be collected from experiments designed for collecting such data. Alternatively, the data records may be generated artificially by other related processes, such as a design process. The data records may reflect characteristics of the input parameters and output parameters, such as statistic distributions, normal ranges, and/or tolerances, etc.

Once the data records are obtained (step 402), processor 202 may pre-process the data records to clean up the data records for obvious errors and to eliminate redundancies (step 404). Processor 202 may remove approximately identical data records and/or remove data records that are out of a reasonable range in order to be meaningful for model generation and optimization. After the data records have been pre-processed, processor 202 may then select proper input parameters by analyzing the data records (step 406).

The data records may include many input variables. The number of input variables may be greater than the number of the input parameters or variables used for control model 300. For example, in addition to values corresponding to input parameters or variables of gas pedal indication, gear selection, atmospheric pressure, and engine temperature, the data records may also include input variables such as fuel indication, tracking control indication, and/or other engine parameters.

In certain situations, the number of input variables may exceed the number of the data records and lead to sparse data scenarios. Some of the extra input variables may be omitted in certain mathematical models. The number of the input variables may need to be reduced to create mathematical models within practical computational time limits.

Processor 202 may select input parameters according to predetermined criteria. For example, processor 202 may choose input parameters by experimentation and/or expert opinions. Alternatively, in certain embodiments, processor 202 may select input parameters based on a mahalanobis distance between a normal data set and an abnormal data set of the data records. The normal data set and abnormal data set maybe defined by processor 202 by any proper method. For example, the normal data set may include characteristic data associated with the input parameters that produce desired output parameters. On the other hand, the abnormal data set may include any characteristic data that may be out of tolerance or may need to be avoided. The normal data set and abnormal data set may be predefined by processor 202.

Mahalanobis distance may refer to a mathematical representation that may be used to measure data profiles based on correlations between parameters in a data set. Mahalanobis distance differs from Euclidean distance in that mahalanobis distance takes into account the correlations of the data set. Mahalanobis distance of a data set X (e.g., a multivariate vector) may be represented as $$MD_i = (X_i - \mu_x)\Sigma^{-1}(X_i - \mu_x)' \tag{1}$$

where $\mu_x$ is the mean of X and $\Sigma^{-1}$ is an inverse variance-covariance matrix of X. $MD_i$ weights the distance of a data point $X_i$ from its mean $\mu_x$ such that observations that are on the same multivariate normal density contour will have the same distance. Such observations may be used to identify and select correlated parameters from separate data groups having different variances.

Processor 202 may select a desired subset of input parameters such that the mahalanobis distance between the normal data set and the abnormal data set is maximized or optimized. A genetic algorithm may be used by processor 202 to search the input parameters for the desired subset with the purpose of maximizing the mahalanobis distance. Processor 202 may select a candidate subset of the input parameters based on a predetermined criteria and calculate a mahalanobis distance $MD_{normal}$ of the normal data set and a mahalanobis distance $MD_{abnormal}$ of the abnormal data set. Processor 202 may also calculate the mahalanobis distance between the normal data set and the abnormal data (i.e., the deviation of the mahalanobis distance $MD_x = MD_{normal} - MD_{normal}$). Other types of deviations, however, may also be used.

Processor 202 may select the candidate subset of the input parameters if the genetic algorithm converges (i.e., the genetic algorithm finds the maximized or optimized mahalanobis distance between the normal data set and the abnormal data set corresponding to the candidate subset). If the genetic algorithm does not converge, a different candidate subset of the input parameters may be created for further searching. This searching process may continue until the genetic algorithm converges and a desired subset of the input parameters is selected.

After selecting input parameters (e.g., gas pedal indication, gear selection, atmospheric pressure, and temperature, etc.), processor 202 may generate a computational model to build interrelationships between input parameters and output parameters (step 408). Any appropriate type of neural network may be used to build the computational model. The type of neural network models used may include back propagation, feed forward models, cascaded neural networks, and/or hybrid neural networks, etc. Particular types or structures of the neural network used may depend on particular applications. Other types of models, such as linear system or non-linear system models, etc., may also be used.

The neural network computational model may be trained by using selected data records. For example, the neural network computational model may include a relationship between output parameters (e.g., boot control, throttle valve setting, etc.) and input parameters (e.g., gas pedal indication, gear selection, atmospheric pressure, and engine temperature, etc). The neural network computational model may be evaluated by predetermined criteria to determine whether the training is completed. The criteria may include desired ranges of accuracy, time, and/or number of training iterations, etc.

After the neural network has been trained (i.e., the computational model has initially been established based on the predetermined criteria), processor 202 may statistically validate the computational model (step 410). Statistical validation may refer to an analyzing process to compare outputs of the neural network computational model with actual outputs to determine the accuracy of the computational model. Part of the data records may be reserved for use in the validation process. Alternatively, processor 202 may also generate simulation or test data for use in the validation process.

Once trained and validated, the computational model may be used to determine values of output parameters when provided with values of input parameters. For example, processor 202 may use the computation model to determine throttle valve setting and boot control based on input values of gas pedal indication, gear selection, atmospheric pressure, and engine temperature, etc. The values of output parameters may then be used to control hardware devices of engine control system 120 or engine 110. Further, processor 202 may optimize the model by determining desired distributions of the input parameters based on relationships between the input parameters and desired distributions of the output parameters (step 412).

Processor 202 may analyze the relationships between desired distributions of the input parameters and desired distributions of the output parameters based on particular applications. For example, if a particular application requires a higher fuel efficiency, processor 202 may use a small range for the throttle valve setting and use a large range for the boost control. Processor 202 may then run a simulation of the computational model to find a desired statistical distribution for an individual input parameter (e.g., gas pedal indication, gear selection, atmospheric pressure, or engine temperature, etc). That is, processor 202 may separately determine a distribution (e.g., mean, standard variation, etc.) of the individual input parameter corresponding to the normal ranges of the output parameters. Processor 202 may then analyze and combine the desired distributions for all the individual input parameters to determined desired distributions and characteristics for the input parameters.

Alternatively, processor 202 may identify desired distributions of input parameters simultaneously to maximize the possibility of obtaining desired outcomes. In certain embodiments, processor 202 may simultaneously determine desired distributions of the input parameters based on zeta statistic. Zeta statistic may indicate a relationship between input parameters, their value ranges, and desired outcomes. Zeta statistic may be represented as $$\zeta = \sum_{1}^{j} \sum_{1}^{i} |S_{ij}| \left(\frac{\sigma_i}{\bar{x}_i}\right)\left(\frac{\bar{x}_j}{\sigma_j}\right),$$

where $\bar{x}_i$ represents the mean or expected value of an ith input; $\bar{x}_j$ represents the mean or expected value of a jth outcome; $\sigma_i$ represents the standard deviation of the ith input; $\sigma_j$ represents the standard deviation of the jth outcome; and $|S_{ij}|$ represents the partial derivative or sensitivity of the jth outcome to the ith input.

Processor 202 may identify a desired distribution of the input parameters such that the zeta statistic of the neural network computational model (i.e., the control model) is maximized or optimized. An appropriate type of genetic algorithm may be used by processor 202 to search the desired distribution of input parameters with the purpose of maximizing the zeta statistic. Processor 202 may select a candidate set of input parameters with predetermined search ranges and run a simulation of the control model to calculate the zeta statistic parameters based on the input parameters, the output parameters, and the neural network computational model. Processor 202 may obtain $\bar{x}_i$ and $\sigma_i$ by analyzing the candidate set of input parameters, and obtain $\bar{x}_j$ and $\sigma_j$ by analyzing the outcomes of the simulation. Further, processor 202 may obtain $|S_{ij}|$ from the trained neural network as an indication of the impact of ith input on the jth outcome.

Processor 202 may select the candidate set of input parameters if the genetic algorithm converges (i.e., the genetic algorithm finds the maximized or optimized zeta statistic of the control model corresponding to the candidate set of input parameters). If the genetic algorithm does not converge, a different candidate set of input parameters may be created by the genetic algorithm for further searching. This searching process may continue until the genetic algorithm converges and a desired set of the input parameters is identified. Processor 202 may further determine desired distributions (e.g., mean and standard deviations) of input parameters based on the desired input parameter set.

After control model 300 is optimized (step 412), processor 202 may recalibrate input parameters (step 414). For example, if the desired distribution for input parameter 306 atmospheric pressure is large (i.e., a wide range), processor 202 may allow various values of input parameter 306 with less limitations. On the other hand, if the desired distribution for input parameter 306 is small (i.e., a narrow range), processor 202 may limit and/or adjust values of input parameters such that normal output parameters may be generated. Such optimization processes may be performed in real-time by processor 202 to adopt a different requirement. For example, if higher power is required in another application, processor 202 may optimize the model according to desired distributions for higher power.

The generated and optimized computational model may be used in operation. The derived throttle valve setting and boost control indication may be provided via I/O devices 208 to control relevant hardware devices and/or subsystems of engine 110. Optionally, control model may include a second control model used in combination with control model 300, as illustrated in FIG. 5.

Figure 5:
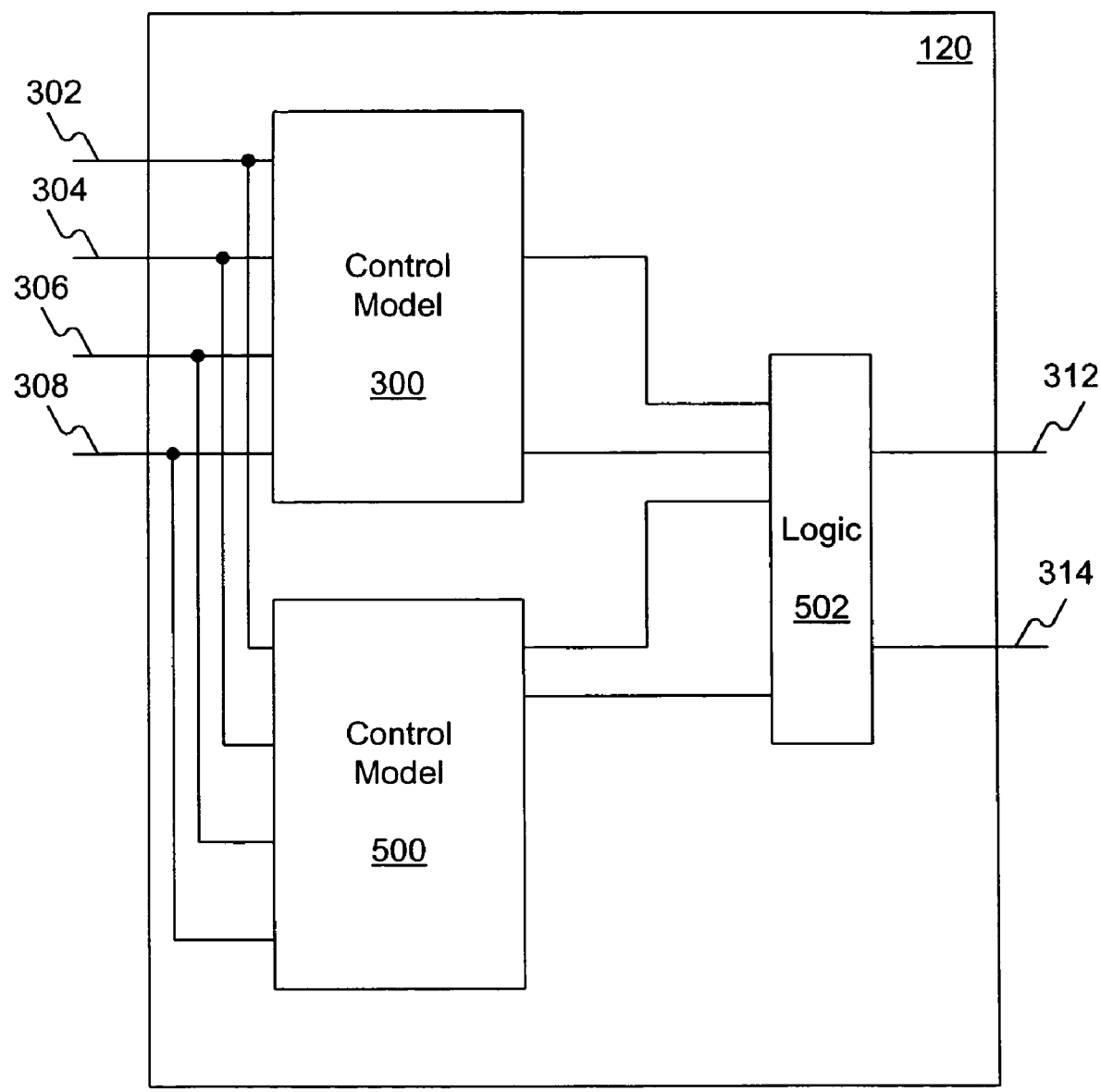
FIG. 5 a block diagram of an engine control system incorporating certain other disclosed embodiments.

As shown in FIG. 5, engine control system 120 may include control model 300, a second control model 500, and a logic 502. Control model 500 may be any type of control model. In certain embodiments, control model 500 may be same type control model as control model 300. Control model 500 may also be provided with the same input parameters as control model 300. Control model 500 may also independently provide the same output parameters based on the input parameters. Further, control model 500 may be generated and optimized using a generation and optimization process similar to control model 300. Control model 500 may be used, for example, as a redundant model. When used as a redundant model, control model 500 may be used when control model 300 fails for any reason.

Alternatively, control model 500 may be used as a reference model. When used as a reference model, control model 500 may be generated and optimized according to reference distributions of the input parameters (e.g., gas pedal indication, gear selection, atmospheric pressure, and engine temperature, etc). Control model 500 may simultaneously produce output parameters (e.g., throttle valve setting, boost control indication, etc.) independent from control model 300. Processor 202 may use logic 502 to compare the output parameters from control model 300 with the output parameters from control model 500. Logic 502 may include any appropriate type of computer hardware component or software program configured to determine a difference between output parameters from control models 300 and 500. If the difference is beyond a predetermined threshold, processor 202 may determine that control model 300 has failed to react to a particular set of input parameters. Processor 202 may choose to continue the operation using previous output parameter values and discard the out-of-range output parameters, or to use output parameters from control model 500. If the number of times for which control model 300 produces out-of-range output parameters exceed a certain limitation, processor 202 may determine that control model 300 has failed, and may generate and optimize a new control model to replace failed control model 300.

INDUSTRIAL APPLICABILITY

The disclosed systems and methods may provide an efficient and optimized solution to a wide range of control systems, such as engine control systems and other work machine control systems. Complex interrelationships may be analyzed during the generation of computational models to optimize the models by identifying desired distributions of input parameters to the models to obtain desired outputs. The accuracy and efficiency of control systems may be significantly improved by using the disclosed systems and methods.

The disclosed systems and methods may also provide high reliability by using two or more computational models similarly generated and optimized. The outputs of the models may be analyzed in real-time to determine the status of the model and/or the desired outputs.

Other embodiments, features, aspects, and principles of the disclosed exemplary systems will be apparent to those skilled in the art and may be implemented in various environments and systems.

What is claimed is:

1. A computer implemented method for a control system, comprising:
    obtaining data records associated with a plurality of input variables and one or more output parameters;
    pre-processing the obtained data records to, at least one of, remove identical data records, remove records that are outside a preliminary desired statistical distribution, and remove erroneous records;
    selecting a plurality of input parameters from the plurality of input variables as a subset of the input variables, a total number of the input parameters being less than a total number of the input variables;
    generating a computational model indicative of interrelationships between the plurality of input parameters and the one or more output parameters based on the data records;
    determining desired respective statistical distributions of the input parameters of the computational model corresponding to desired statistical distributions of the one or more output parameters;
    generating an optimized computational model based at least in part on the previously determined desired respective statistical distributions of the input parameters of the computational model corresponding to desired statistical distributions of the one or more output parameters; and
    using the generated optimized model's output parameters to control the operation of a machine.

2. The method according to claim 1, further including:
    generating a second computational model indicative of referential interrelationships between the plurality of input parameters and the one or more output parameters based on the data records.

3. The method according to claim 2, further including:
    controlling the machine using the values of the one or more output parameters from both the optimized computational model and the second computational model.

4. The method according to claim 3, wherein controlling includes:
    determining a difference between the values of the one or more output parameters from the optimized computational model and the values of the one or more output parameters from the second computational model;

determining whether the difference is beyond a predetermined threshold; and deciding a failure of the optimized computational model if the difference is beyond the threshold.

5. The method according to claim 4, further including:
controlling the machine using the values of the output parameters from the second computational model.

6. The method according to claim 1, wherein selecting further includes:
using a genetic algorithm to select the plurality of input parameters from the plurality of input variables based on a mahalanobis distance between a normal data set and an abnormal data set of the data records.

7. The method according to claim 1, wherein generating the computational model further includes:
creating a neural network computational model;
training the neural network computational model using the data records; and
validating the neural network computation model using the data records.

8. A computer-implemented method for a control system, comprising:
obtaining data records associated with one or more input variables and one or more output parameters;
selecting one or more input parameters from the one or more input variables;
generating a computational model indicative of interrelationships between the one or more input parameters and the one or more output parameters based on the data records;
determining desired respective statistical distributions of the input parameters of the computational model; and
controlling operation of a machine based on the desired respective statistical distributions of the input parameters of the computational model,
wherein determining further includes:
determining a candidate set of input parameters with a maximum zeta statistic using a genetic algorithm; and
determining the desired distributions of the input parameters based on the candidate set,
wherein the zeta statistic $\zeta$ is represented by:

$$\zeta = \sum_{1}^{j}\sum_{1}^{i}|S_{ij}|\left(\frac{\sigma_i}{\bar{x}_i}\right)\left(\frac{\bar{x}_j}{\sigma_j}\right),$$

provided that $\bar{x}_i$ represents a mean of an ith input; $\bar{x}_j$ represents a mean of a jth output; $\sigma_i$ represents a standard deviation of the ith input; $\sigma_j$ represents a standard deviation of the jth output; and $|S_{ij}|$ represents sensitivity of the jth output to the ith input of the computational model.

9. A control system, comprising:
one or more input elements configured to accept respective a plurality of input parameters to the control system;
one or more output elements configured to accept respective one or more output parameters; and
a processor configured to control a machine using the one or more output parameters based on a control model, wherein the control model is created by:
obtaining data records associating with the plurality of input parameters and one or more output parameters;
pre-processing the obtained data records to, at least one of, remove identical data records, remove records that are outside a preliminary desired statistical distribution, and remove erroneous records;
generating a computational model indicative of interrelationships between the plurality of input parameters and the one or more output parameters based on the data records;
determining desired respective statistical distributions of the plurality of input parameters of the computational model corresponding to desired statistical distributions of the one or more output parameters;
generating an optimized computational model based at least in part on the previously determined desired respective statistical distributions of the input parameters of the computational model corresponding to desired statistical distributions of the one or more output parameters, wherein output parameters of the generated optimized model are used to control the operation of the machine.

10. The control system according to claim 9, wherein creating the control model further includes:
generating a second computational model indicative of referential interrelationships between the plurality of input parameters and the one or more output parameters based on the data records.

11. The control system according to claim 10, the processor is further configured to:
determine a difference between the values of the one or more output parameters from the optimized computational model and the values of the one or more output parameters from the second computational model;
determine whether the difference is beyond a predetermined threshold;
decide that the optimized computational model has failed if the difference is beyond the threshold; and
control the machine using the values of the one or more output parameters from the second computational model.

12. The control system according to claim 11, wherein the processor is further configured to:
control the machine using the values of the one or more output parameters from the optimized computational model if the difference is not beyond the threshold.

13. The control system according to claim 9, wherein generating the computational model further includes:
creating a neural network computational model;
training the neural network computational model using the data records; and
validating the neural network computation model using the data records.

14. A control system, comprising:
one or more input elements configured to accept respective one or more input parameters to the control system;
one or more output elements configured to accept respective one or more output parameters; and
a processor configured to control one or more hardware devices using the one or more output parameters based on a control model, wherein the control model is created by:
obtaining data records associating with the one or more input parameters and one or more output parameters;
generating a computational model indicative of interrelationships between the one or more input parameters and the one or more output parameters based on the data records;
determining desired respective statistical distributions of the one or more input parameters of the computational model; and
recalibrating the one or more input parameters based on the desired statistical distributions, wherein operation of a machine is controlled based on the desired respective statistical distributions of the one or more input parameters of the computational model, wherein determining further includes:
  determining a candidate set of input parameters with a maximum zeta statistic using a genetic algorithm; and
  determining the desired distributions of the input parameters based on the candidate set,
  wherein the zeta statistic $\zeta$ is represented by:

$$\zeta = \sum_{1}^{j} \sum_{1}^{i} |S_{ij}|\left(\frac{\sigma_i}{\bar{x}_i}\right)\left(\frac{\bar{x}_j}{\sigma_j}\right),$$

provided that $\bar{x}_i$ represents a mean of an ith input; $\bar{x}_j$ represents a mean of a jth output; $\sigma_i$ represents a standard deviation of the ith input; $\sigma_j$ represents a standard deviation of the jth output; and $|S_{ij}|$ represents sensitivity of the jth output to the ith input of the computational model.

15. A computer system, comprising:
  a database containing data records associating a plurality of input variables and one or more output parameters; and
  a processor configured to:
    pre-process the data records to, at least one of, remove identical data records, remove records that are outside a preliminary desired statistical distribution, and remove erroneous records;
    select a plurality of input parameters from the plurality of input variables as a subset of the input variables, a total number of the input parameters being less than a total number of the input variables;
    generate a computational model indicative of interrelationships between the plurality of input parameters and the one or more output parameters based on the data records;
    determine desired respective statistical distributions of the plurality of input parameters of the computational model corresponding to desired statistical distributions of the one or more output parameters;
    generate an optimized computational model based at least in part on the previously determined desired respective statistical distributions of the input parameters of the computational model corresponding to desired statistical distributions of the one or more output parameters; and
    use the generated optimized model's output parameters to control the operation of a machine.

16. The computer system according to claim 15, wherein, to select one or more the input parameters, the processor is further configured to:
  use a genetic algorithm to select the plurality of input parameters from the plurality of input variables based on a mahalanobis distance between a normal data set and an abnormal data set of the data records.

17. The computer system according to claim 15, wherein, to generate the computational model, the processor is further configured to:
  create a neural network computational model;
  train the neural network computational model using the data records; and
  validate the neural network computation model using the data records.

18. The computer system according to claim 15, wherein, to determine desired respective statistical distributions, the processor is further configured to:
  determine a candidate set of input parameters with a maximum zeta statistic using a genetic algorithm; and
  determine the desired distributions of the input parameters based on the candidate set,
  wherein the zeta statistic $\zeta$ is represented by:

$$\zeta = \sum_{1}^{j} \sum_{1}^{i} |S_{ij}|\left(\frac{\sigma_i}{\bar{x}_i}\right)\left(\frac{\bar{x}_j}{\sigma_j}\right),$$

provided that $\bar{x}_i$ represents a mean of an ith input; $\bar{x}_j$ represents a mean of a jth output; $\sigma_i$ represents a standard deviation of the ith input; $\sigma_j$ represents a standard deviation of the jth output; and $|S_{ij}|$ represents sensitivity of the jth output to the ith input of the computational model.

19. The control system according to claim 9, wherein the control system controls an engine system based on the control model and the one or more output elements.

20. The control system according to claim 19, wherein the engine system provides power for a machine.

21. The method according to claim 1, wherein selecting further includes:
  providing a normal data set and an abnormal data set from the pre-processed data records; and
  using a genetic algorithm to select the plurality of input parameters such that a mahalanobis distance between the normal data set and the abnormal data set, based on the selected plurality of input parameters, is maximized.

* * * * *

UNITED STATES PATENT AND TRADEMARK OFFICE
CERTIFICATE OF CORRECTION

PATENT NO. : 7,565,333 B2  Page 1 of 1
APPLICATION NO. : 11/101532
DATED : July 21, 2009
INVENTOR(S) : Grichnik et al.

It is certified that error appears in the above-identified patent and that said Letters Patent is hereby corrected as shown below:

On the title page, item [56]: under "Other Publications", in Column 2, Line 2, after "John" delete "Wlley" and insert -- Wiley --.

Column 5, line 18, delete "$MD_{normal}-MD_{normal}$" and insert -- $MD_{normal}-MD_{abnormal}$ --.

Signed and Sealed this

Seventeenth Day of November, 2009

David J. Kappos
*Director of the United States Patent and Trademark Office*